(12) United States Patent
Rao et al.

(10) Patent No.: US 11,171,788 B2
(45) Date of Patent: Nov. 9, 2021

(54) SYSTEM AND METHOD FOR SHARED END DEVICE AUTHENTICATION FOR IN-BAND REQUESTS

(71) Applicant: DELL PRODUCTS, LP, Round Rock, TX (US)

(72) Inventors: Balaji Bapu Gururaja Rao, Austin, TX (US); Cyril Jose, Austin, TX (US); Chandrashekar Nelogal, Round Rock, TX (US); Akshata Sheshagiri Naik, Pflugerville, TX (US)

(73) Assignee: Dell Products L.P., Round Rock, TX (US)

( * ) Notice: Subject to any disclaimer, the term of this patent is extended or adjusted under 35 U.S.C. 154(b) by 286 days.

(21) Appl. No.: 16/429,362

(22) Filed: Jun. 3, 2019

(65) Prior Publication Data

US 2020/0382312 A1 Dec. 3, 2020

(51) Int. Cl.
- *H04L 29/06* (2006.01)
- *H04L 9/32* (2006.01)
- *H04L 9/08* (2006.01)
- *H04L 9/06* (2006.01)

(52) U.S. Cl.
CPC .......... *H04L 9/3242* (2013.01); *H04L 9/0637* (2013.01); *H04L 9/0827* (2013.01); *H04L 9/0838* (2013.01); *H04L 9/3263* (2013.01)

(58) Field of Classification Search
CPC ... H04L 9/3242; H04L 9/3263; H04L 9/0838; H04L 9/0827; H04L 9/0637; H04L 2209/38; H04L 9/3239; H04L 9/3265
See application file for complete search history.

(56) References Cited

U.S. PATENT DOCUMENTS

| | | | |
|---|---|---|---|
| 7,398,380 B1 * | 7/2008 | Lovett | G06F 15/177 712/13 |
| 9,742,568 B2 | 8/2017 | Rao et al. | |
| 9,767,067 B2 | 9/2017 | Rao et al. | |
| 9,842,003 B2 | 12/2017 | Rao et al. | |
| 10,102,526 B1 * | 10/2018 | Madisetti | G06Q 20/389 |
| 2004/0098521 A1 * | 5/2004 | Lin | G06F 13/126 710/72 |
| 2011/0314346 A1 * | 12/2011 | Vas | G06F 16/13 714/49 |

(Continued)

FOREIGN PATENT DOCUMENTS

| WO | WO-02099554 A2 * | 12/2002 | ......... G06K 19/0701 |
| WO | WO-2007053454 A1 * | 5/2007 | ........... H04L 9/3236 |

*Primary Examiner* — John B King
(74) *Attorney, Agent, or Firm* — Larson Newman, LLP

(57) ABSTRACT

A converged infrastructure includes a shared device and compute devices. The compute devices include a baseboard management controller and applications including one or more entitled initiators. The baseboard management controllers generate a distributed provision list including certificates chains for the entitled initiators; and configure the shared device with the certificate chains. The shared device receive a critical command and an encrypted hash, determine a calculated hash of the critical command, decrypt the encrypted hash using keys from the certificate chains, and compare the calculated hash with the decrypted hashes to determine if the critical command comes from one of the entitled initiators.

16 Claims, 5 Drawing Sheets

(56) References Cited

U.S. PATENT DOCUMENTS

| | | | | |
|---|---|---|---|---|
| 2013/0091345 | A1* | 4/2013 | Shroff | G06F 21/00 |
| | | | | 713/2 |
| 2017/0177373 | A1* | 6/2017 | Jeansonne | G06F 21/57 |
| 2017/0277649 | A1* | 9/2017 | Lin | G06F 11/3027 |
| 2019/0103967 | A1* | 4/2019 | Meng | H04L 9/3073 |
| 2019/0236732 | A1* | 8/2019 | Speasl | G06Q 50/163 |
| 2019/0340379 | A1* | 11/2019 | Beecham | G06F 16/9014 |
| 2020/0073657 | A1* | 3/2020 | Robison | G06F 9/44589 |
| 2020/0099513 | A1* | 3/2020 | Angelo | H04L 9/0643 |
| 2020/0167775 | A1* | 5/2020 | Reese | G06Q 20/4014 |
| 2020/0349651 | A1* | 11/2020 | Grube | H04L 9/3239 |
| 2020/0366671 | A1* | 11/2020 | Larson | H04L 63/0861 |
| 2021/0035217 | A1* | 2/2021 | Grube | G06Q 20/14 |

* cited by examiner

SYSTEM AND METHOD FOR SHARED END DEVICE AUTHENTICATION FOR IN-BAND REQUESTS

FIELD OF THE DISCLOSURE

The present disclosure generally relates to information handling systems, and more particularly relates to shared end device authentication for in-band requests.

BACKGROUND

As the value and use of information continues to increase, individuals and businesses seek additional ways to process and store information. One option is an information handling system. An information handling system generally processes, compiles, stores, or communicates information or data for business, personal, or other purposes. Technology and information handling needs and requirements can vary between different applications. Thus information handling systems can also vary regarding what information is handled, how the information is handled, how much information is processed, stored, or communicated, and how quickly and efficiently the information can be processed, stored, or communicated. The variations in information handling systems allow information handling systems to be general or configured for a specific user or specific use such as financial transaction processing, airline reservations, enterprise data storage, or global communications. In addition, information handling systems can include a variety of hardware and software resources that can be configured to process, store, and communicate information and can include one or more computer systems, graphics interface systems, data storage systems, networking systems, and mobile communication systems. Information handling systems can also implement various virtualized architectures. Data and voice communications among information handling systems may be via networks that are wired, wireless, or some combination.

SUMMARY

A converged infrastructure can include a shared device and compute devices. The compute devices can include a baseboard management controller and applications including one or more entitled initiators. The baseboard management controllers can generate a distributed provision list including certificates chains for the entitled initiators, and configure the shared device with the certificate chains. The shared device can receive a critical command and an encrypted hash, determine a calculated hash of the critical command, decrypt the encrypted hash using keys from the certificate chains, and compare the calculated hash with the decrypted hashes to determine if the critical command comes from one of the entitled initiators.

BRIEF DESCRIPTION OF THE DRAWINGS

It will be appreciated that for simplicity and clarity of illustration, elements illustrated in the Figures are not necessarily drawn to scale. For example, the dimensions of some elements may be exaggerated relative to other elements. Embodiments incorporating teachings of the present disclosure are shown and described with respect to the drawings herein, in which.

The use of the same reference symbols in different drawings indicates similar or identical items.

DETAILED DESCRIPTION OF THE DRAWINGS

The following description in combination with the Figures is provided to assist in understanding the teachings disclosed herein. The description is focused on specific implementations and embodiments of the teachings and is provided to assist in describing the teachings. This focus should not be interpreted as a limitation on the scope or applicability of the teachings.

Figure 1:
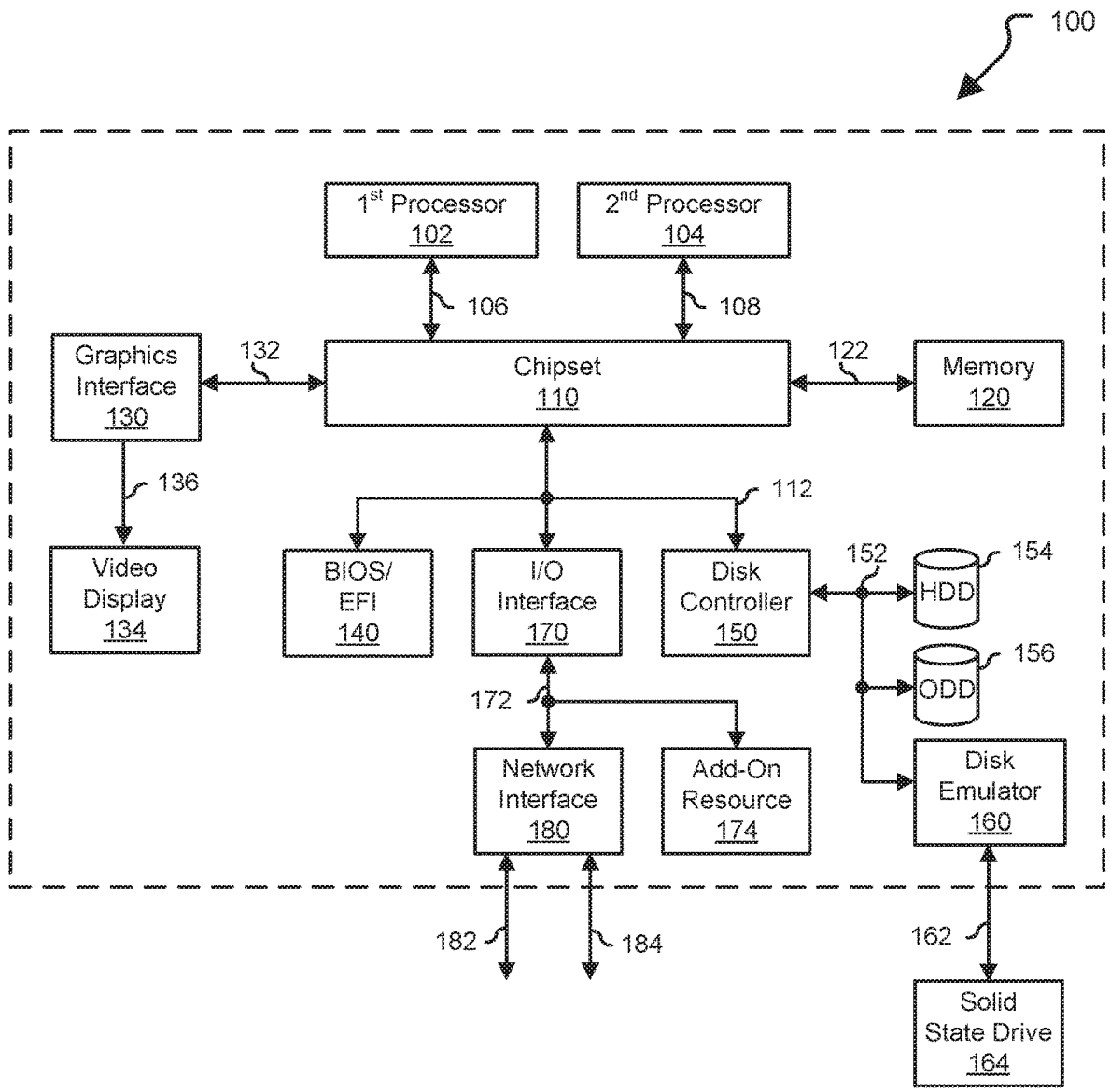
FIG. 1 is a block diagram illustrating a generalized information handling system according to an embodiment of the present disclosure.

FIG. 1 illustrates a generalized embodiment of information handling system 100 including processors 102 and 104, a chipset 110, a memory 120, a graphics interface 130, include a basic input and output system/extensible firmware interface (BIOS/EFI) module 140, a disk controller 150, a disk emulator 160, an input/output (I/O) interface 170, and a network interface 180. Processor 102 is connected to chipset 110 via processor interface 106, and processor 104 is connected to chipset 110 via processor interface 108. Memory 120 is connected to chipset 110 via a memory bus 122. Graphics interface 130 is connected to chipset 110 via a graphics interface 132, and provides a video display output 136 to a video display 134. In a particular embodiment, information handling system 100 includes separate memories that are dedicated to each of processors 102 and 104 via separate memory interfaces. An example of memory 120 includes random access memory (RAM) such as static RAM (SRAM), dynamic RAM (DRAM), non-volatile RAM (NV-RAM), or the like, read only memory (ROM), another type of memory, or a combination thereof.

BIOS/EFI module 140, disk controller 150, and I/O interface 170 are connected to chipset 110 via an I/O channel 112. An example of I/O channel 112 includes a Peripheral Component Interconnect (PCI) interface, a PCI-Extended (PCI-X) interface, a high-speed PCI-Express (PCIe) interface, another industry standard or proprietary communication interface, or a combination thereof. Chipset 110 can also include one or more other I/O interfaces, including an Industry Standard Architecture (ISA) interface, a Small Computer Serial Interface (SCSI) interface, an Inter-Integrated Circuit (I2C) interface, a System Packet Interface (SPI), a Universal Serial Bus (USB), another interface, or a combination thereof. BIOS/EFI module 140 includes BIOS/EFI code operable to detect resources within information handling system 100, to provide drivers for the resources, initialize the resources, and access the resources. BIOS/EFI module 140 includes code that operates to detect resources within information handling system 100, to provide drivers for the resources, to initialize the resources, and to access the resources.

Disk controller 150 includes a disk interface 152 that connects the disc controller to a hard disk drive (HDD) 154, to an optical disk drive (ODD) 156, and to disk emulator 160. An example of disk interface 152 includes an Integrated Drive Electronics (IDE) interface, an Advanced Technology Attachment (ATA) such as a parallel ATA (PATA) interface or a serial ATA (SATA) interface, a SCSI interface, a USB interface, a proprietary interface, or a combination thereof. Disk emulator 160 permits a solid-state drive 164 to be connected to information handling system 100 via an external interface 162. An example of external interface 162 includes a USB interface, an IEEE 1194 (Firewire) interface, a proprietary interface, or a combination thereof. Alternatively, solid-state drive 164 can be disposed within information handling system 100.

I/O interface 170 includes a peripheral interface 172 that connects the I/O interface to an add-on resource 174 and to network interface 180. Peripheral interface 172 can be the same type of interface as I/O channel 112, or can be a different type of interface. As such, I/O interface 170 extends the capacity of I/O channel 112 when peripheral interface 172 and the I/O channel are of the same type, and the I/O interface translates information from a format suitable to the I/O channel to a format suitable to the peripheral channel 172 when they are of a different type. Add-on resource 174 can include a data storage system, an additional graphics interface, a network interface card (NIC), a sound/video processing card, another add-on resource, or a combination thereof. Add-on resource 174 can be on a main circuit board, on separate circuit board or add-in card disposed within information handling system 100, a device that is external to the information handling system, or a combination thereof.

Network interface 180 represents a NIC disposed within information handling system 100, on a main circuit board of the information handling system, integrated onto another component such as chipset 110, in another suitable location, or a combination thereof. Network interface device 180 includes network channels 182 and 184 that provide interfaces to devices that are external to information handling system 100. In a particular embodiment, network channels 182 and 184 are of a different type than peripheral channel 172 and network interface 180 translates information from a format suitable to the peripheral channel to a format suitable to external devices. An example of network channels 182 and 184 includes InfiniBand channels, Fibre Channel channels, Gigabit Ethernet channels, proprietary channel architectures, or a combination thereof. Network channels 182 and 184 can be connected to external network resources (not illustrated). The network resource can include another information handling system, a data storage system, another network, a grid management system, another suitable resource, or a combination thereof.

Figure 2:
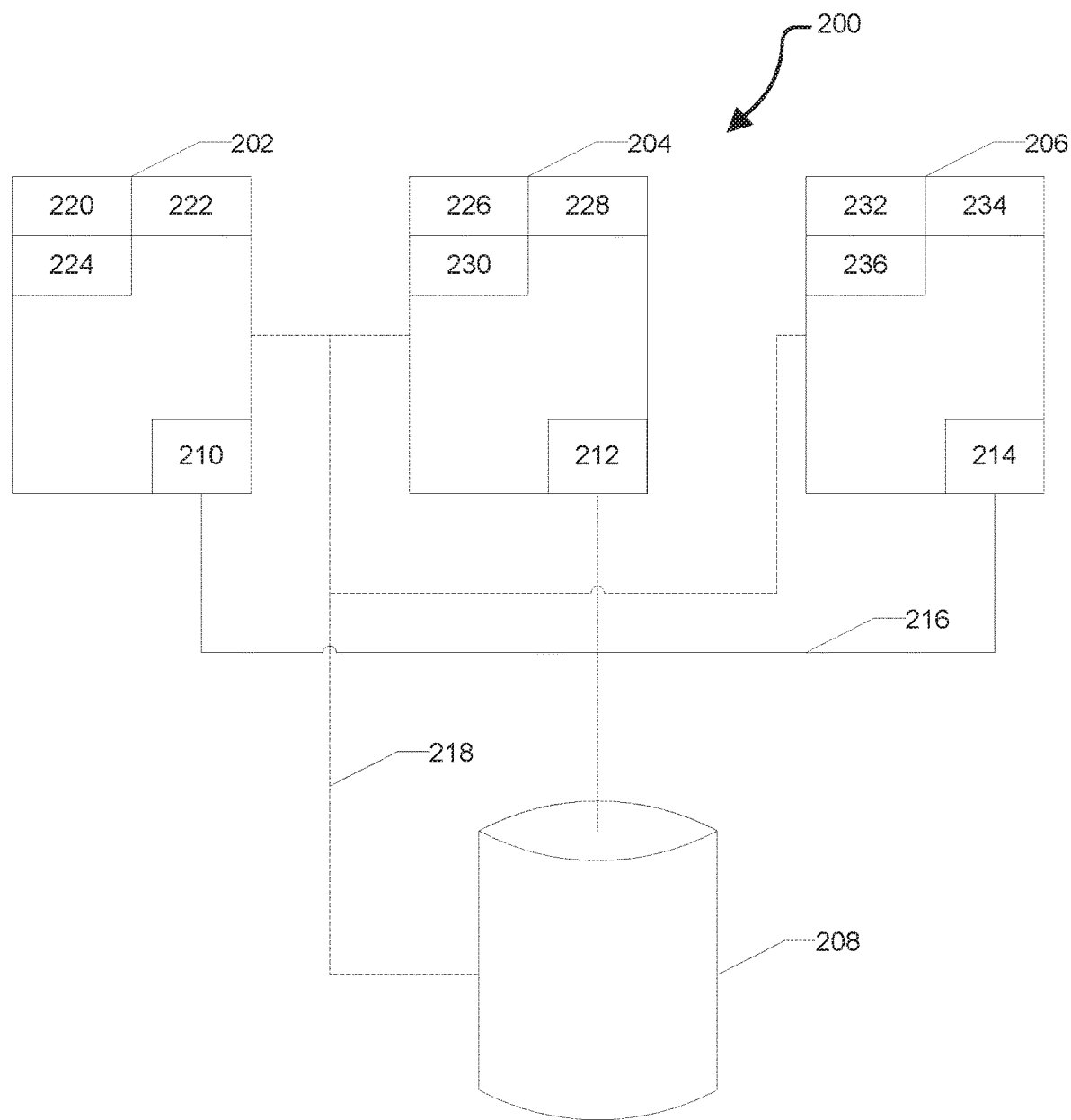
FIG. 2 is a block diagram illustrating an exemplary converged infrastructure according to an embodiment of the present disclosure.

FIG. 2 shows a converged infrastructure 200 in which multiple information technology infrastructure components are grouped together into an optimized computing package. The converged infrastructure 200 can include compute devices 202, 204, and 206 and a shared device 208. Compute devices 202, 204, and 206 can include hardware systems for providing computational power to perform actions. Compute device 202, 204, and 206 can act as applications servers, database servers, and the like. Shared device 208 can be a storage device such as PowerEdge Raid Controller (PERC), Host Bus Adaptor (HBA) or Non-Volatile Memory Express (NVMe) based storage device, or the like. Shared device 208 can be assigned to more than one compute devices, such as compute devices 202, 204, and 206 enabling applications spanning across the infrastructure to access shared device 208.

Compute device 202 can include a baseboard management controller 210 connected to an out-of-band communications channel 216, such as a management network. Similarly, compute device 204 can include baseboard management controller 212 and compute device 206 can include baseboard management controller 214. In various embodiments, the baseboard management controllers 210, 212, and 214 can communicate with each other and with device 208 over the out-of-band communications channel 216 using Management Component Transport Protocol (MCTP).

Compute device 202 can include applications 220, 222, and 224 which can communicate with device 208, such as to store and retrieve information, through an in-band communications channel 218. Similarly, compute device 204 can include applications 226, 228, and 230 and compute device 206 can include applications 232, 234, and 236. Some or all of applications 220, 222, 224, 226, 228, 230, 232, 234, and 236 can be entitled initiators. Entitled Initiators can be applications which are entitled by the product definition or the administrator as a valid initiator of a critical request on a shared device. For example, OEM applications like Open Management Server Administrator (OMSA), vSphere, or vSAN can be entitled initiators by product definition. Additionally, third party application can be configured as an entitled initiator by an administration process.

In various embodiments, the out-of-band communication channel 216 can provide a more secure communication than the in-band communication channel 218 as access to the out-of-band communication channel 216 can be limited to device controller and baseboard management controllers which can be isolated from external networks and user facing applications.

Data manipulation may be countered by the present disclosure, which provides a rigid defense mechanism for end devices lacking management capabilities such as those connected through PCIe root port. Due to this limitation, any critical requests from OS or OS applications such as cryptographic erase, firmware update and so on are executed without thorough validation. An attacker that is successful in breaking into a system in a converged infrastructure, gaining access to OS or an OS application, can take advantage of this flaw to send data destruction requests to the devices causing catastrophic loss to an enterprise. Existing authentication standards, such as USB-C, are designed for standalone end devices and cannot be used in shared infrastructure environments. Additionally, no authentication methods exist which can be applied generically across devices managed (PERC, HBA) and non-managed (NVMe, PCIe based devices which can be accessed from more than one root complex) by dedicated controllers.

Figure 3:
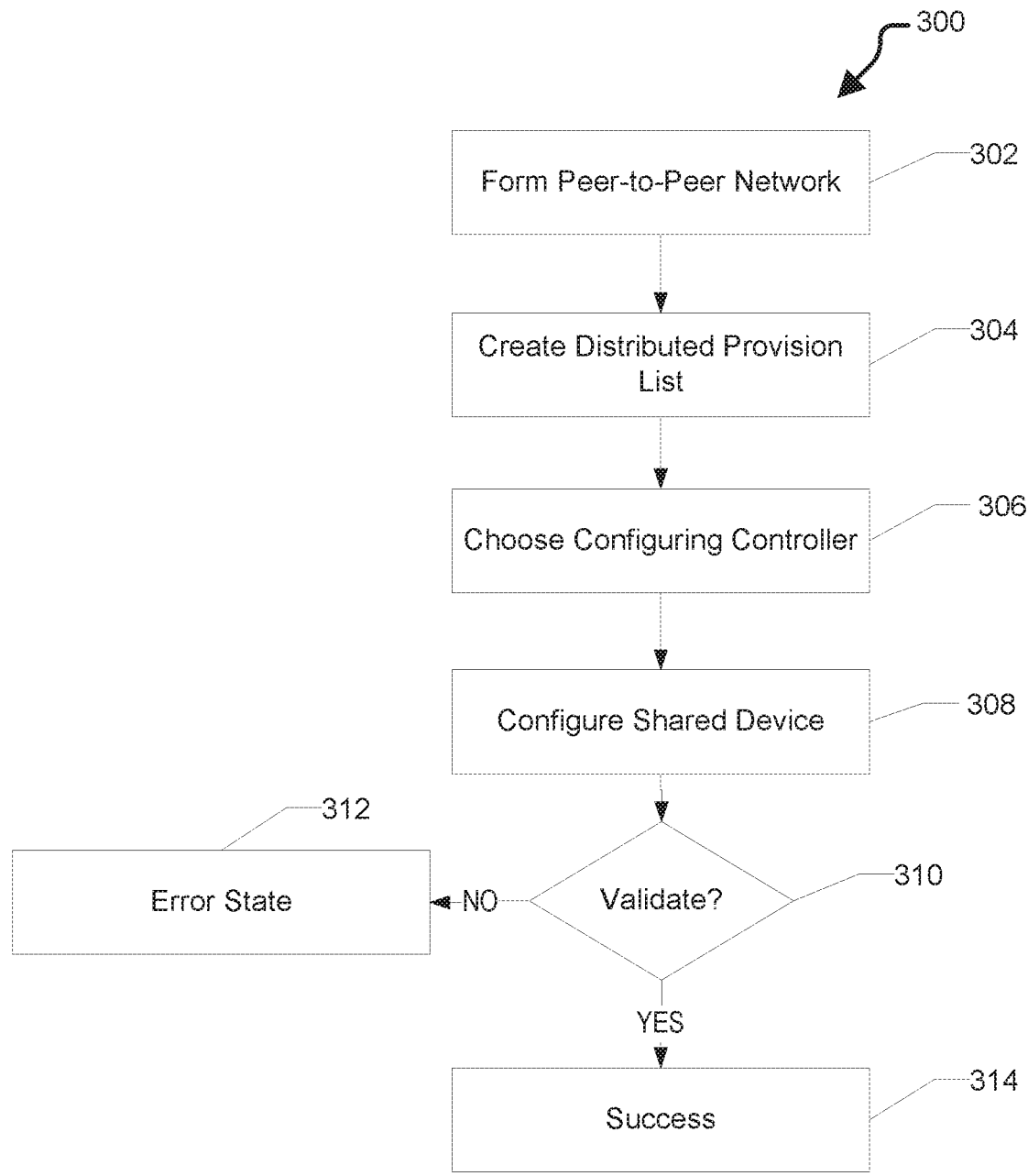
FIG. 3 is a flow diagram illustrating an exemplary method of establishing an authenticated certificate chain according to an embodiment of the present disclosure.

FIG. 3 illustrates an exemplary method 300 of establishing an authenticated certificate chain. At 302, baseboard management controllers can use the out-of-band communications channel to discover the devices of the converged infrastructure and form a peer-to-peer network over the out-of-band communication channel. At 304, a distributed provision list can be generated. In various embodiments, the baseboard management controllers can utilize features of a management mechanism, such as iDRAC Group Manager, to discover and establish an authenticated peer-to-peer network. In various embodiments, creation or modification of the distributed provision list can be performed upon server host insertion or removal, device hot-plug or removal, shared device assignments or reassignments, and the like.

The distributed provision list can include the certificate chain of the entitled initiators. In various embodiments, the baseboard management controllers can obtain the certificate chains from the entitled initiators using known baseboard management controller to host interfaces. In various embodiments, the certificate chain can include public keys for the entitled initiators associated with each of the baseboard management controllers.

In various embodiments, the distributed provision list can be implemented as a blockchain. A blockchain can be a decentralized, distributed and public digital ledger that is used to record transactions across many computers so that any involved record cannot be altered retroactively, without the alteration of all subsequent blocks. Additionally, by storing the blockchain across multiple computers, alteration of the blockchain requires alteration on a majority of the peer systems. In the case of the distributed provision list, a circular blockchain can be used to store the last few blocks. In various embodiments, each baseboard management controller can add an entry to the blockchain including the certificates for the entitled initiators associated with the baseboard management controller.

At 306, a configuring baseboard management controller can be chosen among the peer baseboard management controllers. In various embodiments, the configuring baseboard management controller can be the baseboard management controller associated with the shared device. In various embodiments, the shared device can be associated with a baseboard management controller when directly connected to a system connected to the baseboard management controller. Alternatively, when the shared device is not associated with a specific baseboard management controller, known leader election algorithms can be used to select a configuring baseboard management controller.

At 308, the configuring baseboard management controller can configure the shared device with the list of certificate chains. At 310, the peer baseboard management controllers can read the list of certificate chains from the shared device and validate against the its copy of the distributed provisioning list. If the certificate chains fail to match the distributed provisioning list, the compute device enters into an error state at 312 and can require administrator intervention. In various embodiments, a compute device entering into an error state can indicate an attempt to alter the distributed provisioning list.

Alternatively, when the peer baseboard management controllers successfully validate the list of certificate chains from the shared device, the authenticated certificate chain can be considered successfully established at 314. The list of certificate chains can be successfully validated when the number of entitled initiators and the certificate for each entitled initiator matches.

Figure 4:
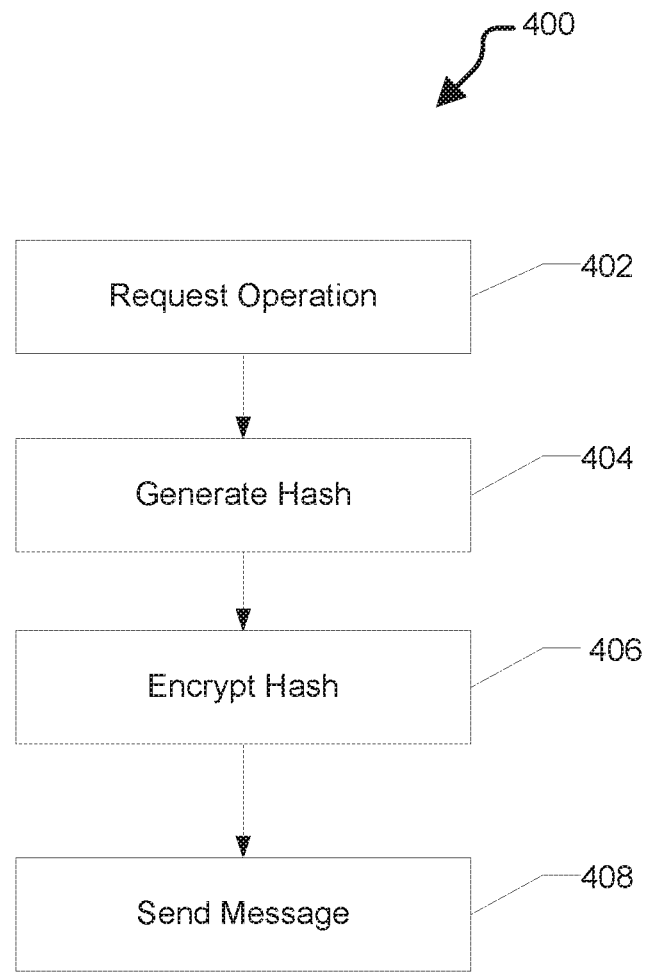
FIG. 4 is a flow diagram illustrating an exemplary method of sending a command according to an embodiment of the present disclosure.

FIG. 4 illustrates an exemplary method 400 of sending a critical in-band request, such as a cryptographic erase, to a shared device. At 402, an operation is requested by an application. At 404, a hash of the command is calculated, and at 406 the hash is encrypted with an private key. At 408 a message is sent including the encrypted hash, the command, and metadata.

Figure 5:
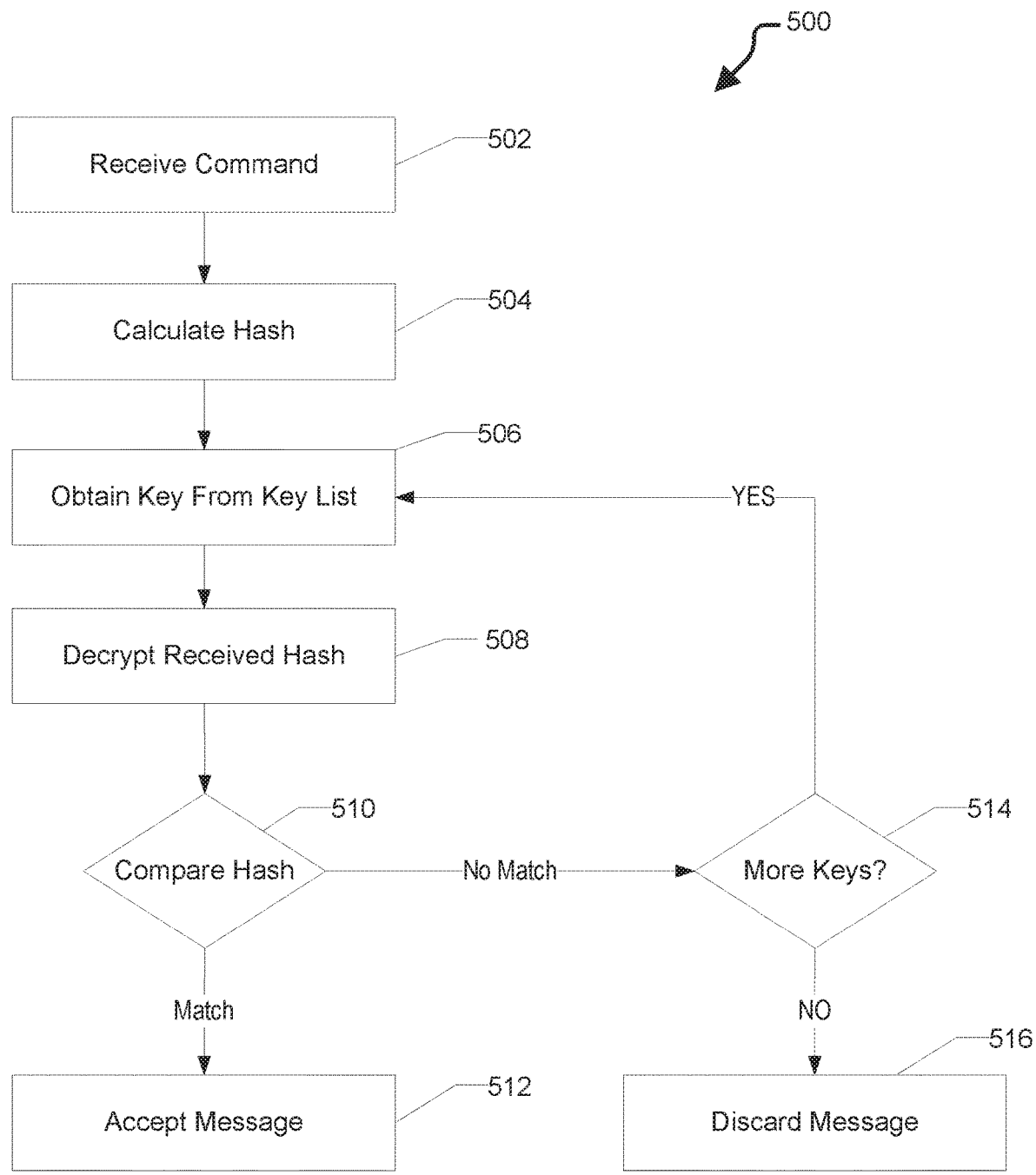
FIG. 5 is flow diagram illustrating an exemplary method of authenticating a command according to an embodiment of the present disclosure.

FIG. 5 illustrates an exemplary method 500 of authenticating a critical command. At 502, the shared device controller can receive a command, and at 504, the shared device controller can calculate a hash of the command. In various embodiments, the shared device can be a smart shared device with an internal controller. Alternatively, the shared device may not have an internal controller and the shared device controller can be a baseboard management controller or other system to which the shared device is connected.

At 506, the shared device can obtain a key from the key list for entitled initiators authorized for the command. In various embodiments, the keys in the key list can be public keys of the entitled initiators. At 508, the shared device can decrypt the hash with a public key from the key list, and at 510 can compare the decrypted hash with the calculated hash. If the decrypted hash matches the calculated hash, the command can be accepted, as shown at 512. Alternatively, if the decrypted hash does not match the calculated hash, the shared device can determine if there are additional keys at 514. If there are more keys to try, the shared device can retrieve another key from the key list, as shown at 506, and decrypt the hash with new key at 508. If all keys have been tried without finding a match, the shared device can reject the command, as shown at 516.

In various embodiments, the selection of keys can progress through the key list from the first key to the last key. Alternatively, the key list can be organized by associated baseboard management controller or other identifying information allowing the selection of keys to start at a point that may be closer to the necessary key.

In various embodiments, when the shared device is capable of maintaining the list of certificate chains, the list of certificate chains can be stored and processed by the shared device. Alternatively, when the shared device is not configured for storing and processing sufficient certificate chains, the configuring baseboard management controller or a host system can maintain and process the certificate chain and forward accepted commands to the shared device. In various embodiments, the configuring baseboard management controller or host system can authenticate with the shared device and forward accepted commands using the authentication as if they came from the configuring baseboard management controller or host system.

For purpose of this disclosure information handling system 100 can include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, information handling system 100 can be a personal computer, a laptop computer, a smart phone, a tablet device or other consumer electronic device, a network server, a network storage device, a switch router or other network communication device, or any other suitable device and may vary in size, shape, performance, functionality, and price. Further, information handling system 100 can include processing resources for executing machine-executable code, such as a central processing unit (CPU), a programmable logic array (PLA), an embedded device such as a System-on-a-Chip (SoC), or other control logic hardware. Information handling system 100 can also include one or more computer-readable medium for storing machine-executable code, such as software or data. Additional components of information handling system 100 can include one or more storage devices that can store machine-executable code, one or more communications ports for communicating with external devices, and various input and output (I/O) devices, such as a keyboard, a mouse, and a video display. Information handling system 100 can also include one or more buses operable to transmit information between the various hardware components.

Information handling system 100 can include devices or modules that embody one or more of the devices or modules described above, and operates to perform one or more of the methods described above.

Although only a few exemplary embodiments have been described in detail above, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

What is claimed is:

1. A converged infrastructure comprising:
   a shared device; and
   a plurality of compute devices, the compute devices including a baseboard management controller and a plurality of applications, a subset of the applications being entitled initiators;
   the baseboard management controller configured to:
      establish a peer-to-peer network of baseboard management controllers over an out-of-band communication channel;
      generate a distributed provision list including a certificate chain for the entitled initiators;
      configure the shared device with the certificate chain; and
      validate the certificate chain from the shared device against the distributed provision list; and
   the shared device configured to:
      receive a critical command and an encrypted hash;
      determine a calculated hash of the critical command;
      decrypt the encrypted hash using a plurality of keys from the certificate chain; and
      compare the calculated hash with the plurality of decrypted hashes to determine if the critical command comes from one of the entitled initiators based on determining a match between the calculated hash and one of the decrypted hashes.

2. The converged infrastructure of claim 1, wherein the baseboard management controllers are further configured to enter into an error state when validating fails and to notify an administrative user of the failed validation.

3. The converged infrastructure of claim 1, wherein the distributed provision list is a blockchain ledger.

4. The converged infrastructure of claim 3, wherein the blockchain ledger is a circular blockchain ledger.

5. The converged infrastructure of claim 1, wherein the certificate chain includes public keys of the entitled initiators.

6. The converged infrastructure of claim 1, wherein the baseboard management controllers are further configured to create or update the distributed provision list upon server host insertion or removal, device hot-plug or removal, shared device assignments or reassignments.

7. A method of establishing an authenticated certificate chain for a shared device, comprising:
   establishing a peer-to-peer network of baseboard management controllers over an out-of-band communication channel;
   generating a distributed provision list including public keys of a plurality of entitled initiators;
   configuring a shared device with a certificate chain including the public keys;
   validating the certificate chain from the shared device against the distributed provision list;
   receiving, at the shared device, a critical command and an encrypted hash;
   determining a calculated hash of the critical command;
   decrypting the encrypted hash using the public keys from the certificate chain; and
   comparing the calculated hash with the decrypted hashes to determine if the critical command comes from one of the entitled initiators based on determining a match between the calculated hash and one of the decrypted hashes.

8. The method of claim 7, wherein when validating fails, entering into an error state and notifying an administrative user of the failed validation.

9. The method of claim 7, further comprising the baseboard management controllers perform discovery over the out-of-band communication channel prior to establishing the peer-to-peer network.

10. The method of claim 7, further comprising creating or updating the distributed provision list upon server host insertion or removal, device hot-plug or removal, shared device assignments or reassignments.

11. The method of claim 7, wherein the out-of-band communication channel is a dedicated management local area network.

12. The method of claim 7, further comprising performing the critical command when the calculated hash matches a decrypted hash using one of the public keys from the certificate chain.

13. The method of claim 7, wherein the encrypted hash is encrypted with a private key of the application.

14. The method of claim 7, further comprising decrypting the encrypted hash using a second key from the certificate chain and comparing the calculated hash to the second decrypted hash.

15. The method of claim 7, further comprising discarding the critical command when all of the public keys from the certificate chain have been used to decrypt the hash and no match is found.

16. The method of claim 7, wherein the critical command is received over an in-band communication channel.

* * * * *